United States Patent [19]

Holmes, Jones F. et al.

[11] 4,300,836
[45] Nov. 17, 1981

[54] ELECTRO-OPTICAL SCANNING SYSTEM WITH SELF-ADAPTIVE SCANNING CAPABILITY

[75] Inventors: Holmes, Jones F., Portland; Ralph L. Jacob, Aloha, both of Oreg.

[73] Assignee: Oregon Graduate Center for Study and Research, Beaverton, Oreg.

[21] Appl. No.: 86,725

[22] Filed: Oct. 22, 1979

[51] Int. Cl.³ ............................................. G01B 11/24
[52] U.S. Cl. .................... 356/376; 250/202; 356/377
[58] Field of Search .............................. 356/375–377, 356/386–387, 394, 5, 380; 250/202

[56] References Cited

U.S. PATENT DOCUMENTS

| | | | |
|---|---|---|---|
| 3,050,581 | 8/1962 | Bomba et al. | 250/202 |
| 3,724,923 | 4/1973 | Fischer | 250/202 |
| 3,757,125 | 9/1973 | Okada et al. | 250/202 |
| 3,806,253 | 4/1974 | Denton | 356/376 |
| 3,852,579 | 12/1974 | Sohn | 356/387 |
| 4,209,252 | 6/1980 | Arditty et al. | 356/377 |

*Primary Examiner*—William H. Punter
*Attorney, Agent, or Firm*—Kolisch, Hartwell & Dickinson

[57] ABSTRACT

A scanner profiling system for locating and "mapping" a selected "feature" in a three-dimensional object, which "feature" is nearest with respect to a defined datum plane. The system includes a laser-distancing-instrument (LDI), and a cooperating motor-driven mirror apparatus which is operated under digital computer control to shift the scan axis of the system, in preselected steps, throughout a defined scan field. Object "feature" location, and related scan orientation data which are obtained during a scanning operation, effect computer scan control, whereby scanning "attention", within the total scan field, is directed particularly to "track" the selected "feature".

2 Claims, 7 Drawing Figures

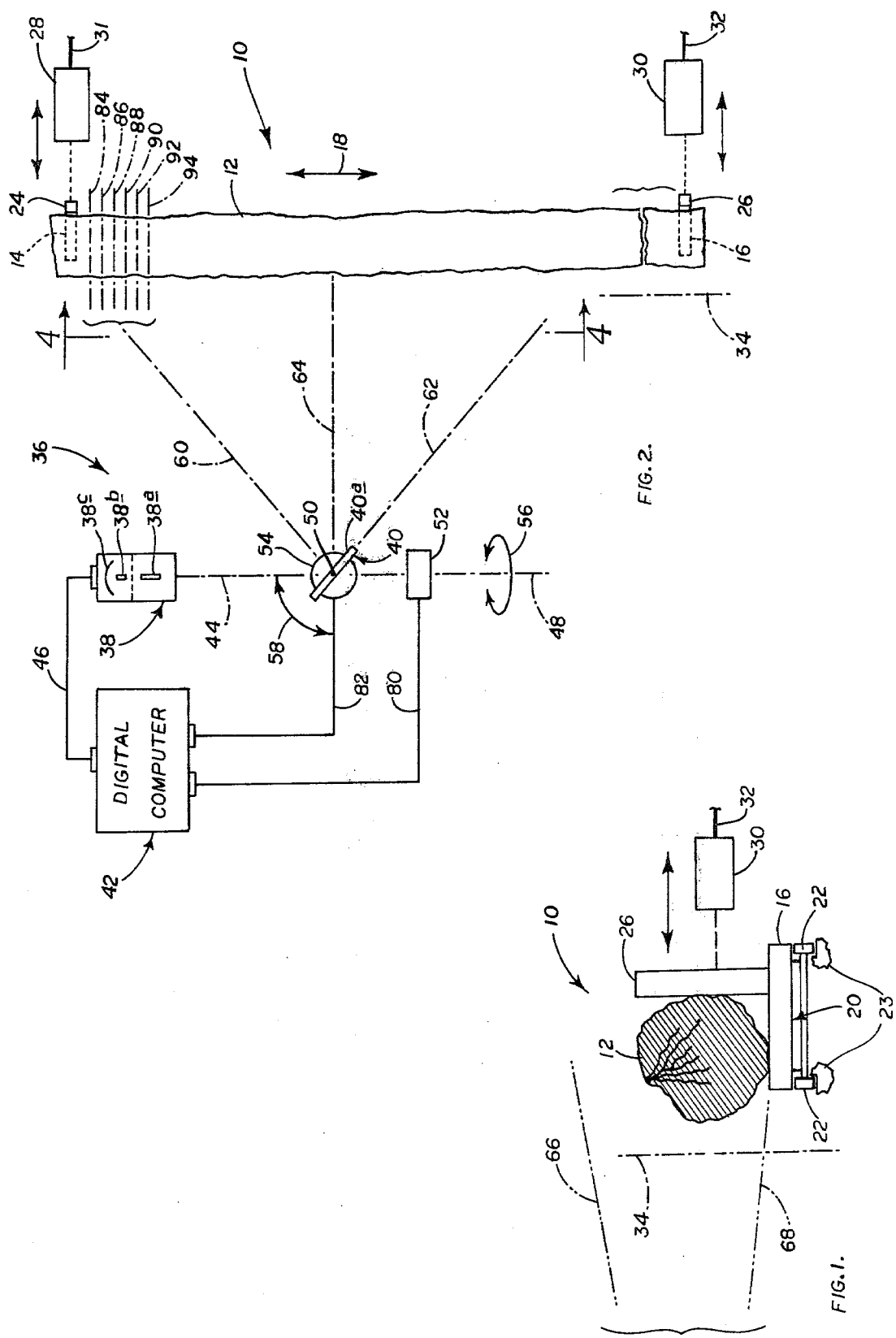

ELECTRO-OPTICAL SCANNING SYSTEM WITH SELF-ADAPTIVE SCANNING CAPABILITY

BACKGROUND AND SUMMARY OF THE INVENTION

This invention pertains to a scanner profiling system for locating and "mapping" a selected feature in a three-dimensional object, which feature is nearest with respect to a defined datum plane. More specifically, the invention pertains to such a system wherein scanning-derived data are used in conjunction with a digital computer to focus the scanning attention of the system particularly toward the selected feature. For the purpose of illustration herein, the system of the invention is described with particular reference to handling two different profiling problems commonly encountered in a saw mill.

In recent years, there has been an ever increasing amount of concern paid to minimizing the amount of wood waste generated in a saw mill. There are many reasons for this growing concern. To begin with, timber resources, and particularly resources of large-diameter timber, having dwindled significantly. Saw mill operators, faced with this situation, have recognized the need to maximize yield from the smaller-available logs, with particular attention paid to accurate placement of saw cuts so as to minimize processing wastes.

A further trend in the saw-mill industry has been the increasing use of computers to monitor and control various mill operations. For example, it has been conventional for many years to have saw-cut decisions made by an experienced mill person who "reads" a log, cant, board, etc. and then personally decides where to place the workpiece (which is to be cut) relative to a saw blade to obtain maximum yield. The modern trend of harnessing computers to such a task has seen widespread incorporation in saw mills of so-called optical scanners which take over, with a significantly higher degree of accuracy, the task of "reading" the object to be cut. Data derived from these scanners is fed, typically, into a digital computer, which then performs one or more calculations to determine where a cut or cuts in the object should be made. The computer, further, and on the basis of such determination, outputs appropriate control signals to effect automatic manipulation and cutting of the object.

Two typical decision-making tasks which are presented in a saw mill, and with respect to which an embodiment of the present invention is described below, include the decision of how to position an uncut log for what is known as the opening-face cut in a head-rig band saw, and the determination, with respect to cants which are cut from a log, of how to place such cants with respect to edger saws to remove what is known as the wane portions in the cants.

In the case of deciding how to position an uncut log for an opening-face cut, an important feature in the log is what might be thought of as the ridge-like path of the portion of the log which is nearest to the cutting plane of the head-rig saw blade. By scanning a log preparatory to its being fed into a head-rig apparatus, and thereby locating this "near point" ridge, data are obtainable to enable proper positioning of the log relative to the saw blade.

A feature which is important in determining how to trim the edges of a cant to get rid of wane is the line of joinder between the wane and the adjacent sawn face of the cant. By mapping or locating this line of joinder, data, again, are readily obtainable to position the cant appropriately relative to an edger saw blade.

A general object of the present invention is to provide a unique scanner profiling system which is capable of performing profiling tasks, like those just briefly outlined above, with an extremely high degree of accuracy and efficiency.

More particularly, an object of the invention is to provide such a system wherein scanning apparatus is designed with a relatively wide-range scanning field (to accommodate object features which may be distributed, for various objects, at different widely spaced locations in the field), and which further includes control equipment that monitors incoming scan data with respect to an object, so as to direct scanning "attention" particularly only to that portion of the total scanning field where the particular object feature that is being mapped is located.

Expressed in somewhat greater detail, the scanning system of the invention operates in what is referred to herein as an adaptive scanning mode, wherein successive scanning sweeps throughout a scanning operation are progressively centered on the last-noted axial position of the feature towards which the scanning system's attention is directed. For example, with the system of the present invention, and considering its use in scanning the side of a log being prepared for feeding to a head-rig apparatus, range data derived from each successive scanning sweep (which moves substantially transverse to the log's longitudinal axis) are monitored to detect the point on the log noted in the sweep which is nearest to the plane of the head-rig saw blade, and the position of this point relative to the long axis of the scanning sweep. With such notation, the next successive scanning sweep is located so that its central point (i.e. between its opposite ends) is centered on the longitudinal location (relative to the scan sweep's axis) of the last-noted near point. Thus, with a bent or crooked log, successive adjacent scanning sweeps that are distributed along the length of the log are adjusted longitudinally relative to one another to maintain the scanning system's attention substantially centered on the near-point ridge feature in the log. As a consequence of such an adaptive scanning operation, accurate mapping information is obtained in a minimal amount of time.

Various other features and advantages which are offered by the invention will become more fully apparent as the description which now follows is read in conjunction with the accompanying drawings.

DETAILED DESCRIPTION OF THE DRAWINGS

FIG. 1 is a simplified schematic end view of a log in a saw mill on a carriage being prepared to feed the log into a head-rig band saw.

FIG. 2 is a reduced-scale, simplified, fragmentary, schematic plan view of the log and carriage of FIG. 1, and further of portions of a scanner profiling system constructed in accordance with the invention.

DETAILED DESCRIPTION OF THE INVENTION

Figure 3:
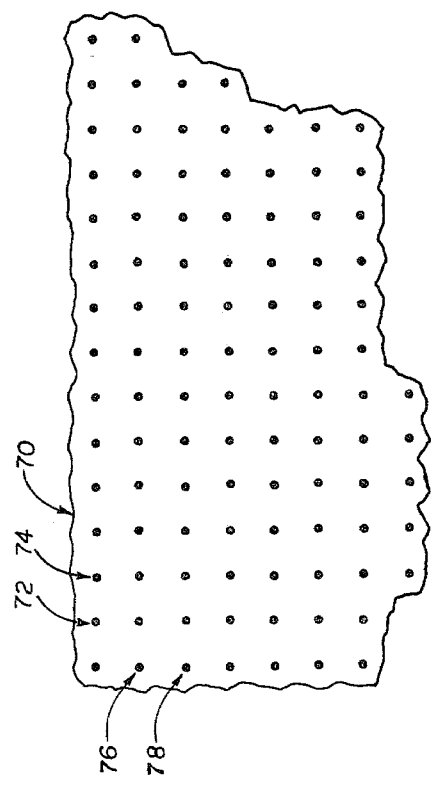
FIG. 3 is a fragmentary developed view of a scanning field characterizing the profiling system of FIG. 2.

Turning now to the drawings, and with reference first to FIGS. 1 and 2, indicated generally at 10 is what might be thought of as an entry station in a saw mill where logs are prepared for feeding into a conventional head-rig band saw. Station 10 is also referred to herein as an observation zone. Shown within zone 10 is a typical log 12 which is supported on the usual pair of interconnected, spaced carriage bunks, such as the two shown at 14, 16, that form part of a carriage 20 (see FIG. 1) which is reversibly moveable via wheels 22 and tracks 23 (FIG. 1) in the direction of double-ended arrow 18 in FIG. 2. Carriage 20 functions to feed logs, such as log 12, back and forth through a head-rig saw. The carriage is also referred to herein as a support and transport system for a log. Log 12, shown in FIG. 2 with a portion removed, is about 16-inches in diameter, and about 32-feet long. Mounted on the carriage, on each carriage bunk, is a conventional upright knee such as the two knees shown at 24, 26 on bunks 14, 16, respectively. As is well understood, these knees are mounted for reversible lateral movement on the carriage, to adjust the angular and lateral position of a log on the bunks. Knees 24, 26 are moved under the influence of hydraulic motors 28, 30, respectively—these motors being suitably mounted on the frame of the carriage. Motors 28, 30 are solenoid actuated, with solenoid control signals therefor being supplied over cables of conductors such as the cables shown at 31, 32 for motors 28, 30, respectively.

As has been mentioned, all of the apparatus so far described in station 10 is used for the purpose of positioning, and ultimately maneuvering, a log with respect to a head-rig band saw blade. In FIG. 1, the head-rig saw blade is located toward the viewer from the figure, and in FIG. 2 it is located below station 10. What might be thought of as the cutting plane of the saw blade is represented by dash-dot line 34. In FIGS. 1 and 2 log 12 is shown displaced to the right of cutting plane 34.

One of the problems, as mentioned earlier, which confronts a saw mill operator, at the location of the head-rig apparatus, is the decision of how to set what is known as the "taper" of a log relative to the head-rig's cutting plane, for the purpose of making an opening face cut. The term "taper" is used herein to refer to the angular orientation of the log's longitudinal axis relative to the head-rig cutting plane. In the past, this decision has been made by an operator viewing the contour of a log as it sits on the carriage, and particularly by viewing the contour or path of what might be thought of as the longitudinal ridge along that side of the log which is nearest the cutting plane.

Indicated generally at 36 in FIG. 2 is a scanner profiling system constructed in accordance with the invention. System 36 is useable, as will shortly be described, to assist in making an opening-face-cut decision automatically, and with an extremely high degree of accuracy. System 36 herein is capable of "handling" an 8-foot length of a log. Carriage 20, however, is sized to handle logs somewhat in excess of 32-feet. Accordingly, three other side-by-side disposed systems, like system 36, are used in the mill being described—distributed generally at 8-foot intervals along the left side of carriage 20 in FIGS. 1 and 2. Each system is located generally in a position to confront that face of a log which is nearest the head-rig cutting plane. Ordinarily, a scanning system, like system 36, would not be located at essentially the same level as a log on carriage 20. Such positioning would be unsafe. However, and for the purpose of simplifying the description herein, system 36, and its three companion systems, are so located. As a practical matter in a saw mill, each such scanning system would normally be located well above the horizontal travel plane of carriage 20.

While it will become obvious to those skilled in the art that the scanning system of the invention can be designed to cover a wide range of different scanning fields, system 36 herein has been constructed to handle an 8-foot length of a log, in the range of diameters from about 10-inches to about 48-inches.

Included in system 36 are a laser-distancing-instrument (LDI) 38, a mirror 40, and a conventional microprocessor-based digital computer 42. Computer 42 is also referred to herein both as a control means, and as a location-determining means. Further, computer 42 is coupled to and shared by the three other systems referred to above as being "like" system 36. LDI 38 is a conventional device which may be thought of as including, essentially, two main subunits which are shown schematically above and below the dashed dividing line employed in the rectangle which represents the LDI. In particular, one of these subunits comprises an amplitude-modulated laser source 38a which transmits a narrow beam of radiation along an axis shown by dash-dot line 44 which extends downwardly from the LDI in FIG. 2. The other main subunit includes a photodetector 38b upon which light from source 38a, which is reflected by an impinged object, and which returns along axis 44, is focused by a reflector and lens system shown schematically at 38c. As will be more fully explained, the modulated light radiation from source 38a is projected outwardly along axis 44 toward mirror 40, which then reflects this beam, as will be described, toward zone 10. When the beam strikes a log, some scattered light is reflected back toward the mirror, and then inwardly along axis 44 whence it is collected by lens system 38c and directed toward photodetector 38b. Through the operations of other components which are contained within LDI 38, light which is detected by photodetector 38b is converted into an electrical signal whose phase is compared to that of the transmitted light signal to determine the "round-trip" propagation time. This information is coupled from the LDI by suitable conductors, represented by line 46, to an input in computer 42, wherein a conventional calculation is performed to determine the distance between any selected reference datum point in system 36 and the particular point of light incidence on the surface of the log. Such a datum point is selected for system 36, and will be identified shortly.

While, as has been mentioned, LDI 38 is a conventional device which is commercially available, one wishing to obtain a further description of the construction and operation of such device is directed to the disclosure of U.S. Pat. No. 3,852,579, issued Dec. 3, 1974.

Mirror 40 in system 36 may take any suitable planar form having a highly reflective surface, such as surface 40a in mirror 40. In system 36, mirror 40 is a circular disc having a diameter of about 6-inches. Mirror 40 is shown in edge view in FIG. 2.

According to a feature of the present invention, mirror 40 is mounted for controlled rotation about two orthogonal axes—one of these axes being shown by dash-dot line 48 in FIG. 2, which axis lies in the plane of FIG. 2 and which is coincident with axis 44, and the other of these being represented by a dot 50 to indicate that such axis intersects axes 44, 48 and is normal to the plane of FIG. 2. Dot, or point 50, constitutes a selected reference datum point in system 36. Provided for rotating mirror 40 about axes 48, 50 are electrical stepping motors 52, 54, respectively. More particularly, motor 52 is operable to produce stepped reversible rotation of mirror 40 about axis 48, as indicated by double-headed curved arrow 56. Similarly, motor 54 is operable to cause stepped reversible rotation of the mirror about axis 50, as indicated by double-headed curved arrow 58.

Motors 52, 54 are substantially identical in construction and operation, and function, when supplied with electrical actuation pulses of one selected polarity, each to rotate the mirror in one direction about the associated axis, in steps of three milliradians per impulse. Reverse-polarity impulses each cause like reverse-stepping of the motors and mirror by the same angular increment.

Adjustment of mirror 40 to different angular positions relative to axes 48, 50 causes what is referred to herein as scanning of the transmitted and reflected radiation emitted and received by LDI 38. While different particular scanning patterns may be used to suit different circumstances, the pattern which is produced by system 36 is intended to handle in station 10, and as was mentioned earlier, logs with diameters ranging from about 10-inches to about 48-inches, throughout a length of about eight feet. Thus, the outer limits of the scan pattern in system 36, as viewed in FIG. 2, are shown by dash-dot lines 60, 62,—these lines diverging to a distance of about eight feet in station 10. The centroid of the scanning pattern of system 36 is shown by dash-dot line 64.

Referring to FIG. 1, dash-double-dot lines 66, 68 show the upper and lower limits, respectively, of the scan pattern. The pattern, as viewed from this point of view, diverges to have a spread of about five feet within station 10.

Source 38a, together with mirror 40, are referred to herein both as a projection scanner and as a directing means. Photodetector 38b, along with lens system 38c and mirror 40, are called collectively a reception scanner, and a collecting means.

Stepped rotation of mirror 40 by motor 52 causes up and down (in FIG. 1) angular movement of the mirror's axis of symmetry relative to zone 10. This symmetry axis, regardless of its instantaneous angular orientation in system 36, is referred to herein both as a direction axis, and as a scanning line. Such axis is, of course, the axis along which the mirror transmits light to and receives it from, the observation zone. Up and down movement as described, with the mirror unmoved by motor 54, constitutes a scanning sweep herein. Stepped rotation of the mirror by motor 54 causes side-to-side angular movement of the mirror's axis of symmetry, thus to shift (along zone 10) the location therein for successive adjacent scanning sweeps. Each step of motor 52, and of motor 54, causes the mirror's axis of symmetry to shift angularly by an increment of 3-milliradians.

Referring now to FIG. 3 along with FIGS. 1 and 2, FIG. 3 illustrates a developed view of a portion of the total scan pattern, or scan field, employed by system 36. This scan field takes the form of a plurality of discrete scanning lines which emanate from point 50 with what might be thought of as spherical spacial uniformity, and which extend toward station 10. If, for example, one were to take a point of view from point 50, and to look toward the concave side of a spherical screen disposed within station 10 and centered on point 50, and if, further, one were to map on this screen the points of incidence of the scanning lines with the screen, one would see a regular distribution of lines and columns of "dots". These dots would appear like those which are shown in FIG. 3, on imaginary screen 70, in columns, such as columns 72, 74, and in rows, such as rows 76, 78. Successive adjacent dots in a given column can be thought of as resulting from successive adjacent stepped positions produced in mirror 40 by motor 52. Similarly, successive adjacent dots in a given row can be thought of as being produced by successive adjacent stepped positions established for the mirror by motor 54. While the specific dimensional layout of the "dots" at the region of imaginary screen 70 (namely, at the location in station 10 where one might expect to find a log) may differ depending upon particular needs or circumstances of an application, adjacent dots in each column and row, as depicted on screen 70, are approximately ½-inch apart. Such dot spacing, of course, in the region of station 10 affects the resolution of system 36.

Completing a description of the structure which is shown in FIG. 2, lines 80, 82 represent conductors which connect the stepping inputs of motors 52, 54, respectively, with associated voltage pulse outputs which are of conventional design, and which form a part of computer 42. As will be explained, stepping of motors 52, 54, as well as of the corresponding motors in the three other companion systems, is under the direct control of computer 42. Computer 42, in turn, operates in response to an internally stored control program, a portion of which is illustrated in the flow chart of FIG. 7. This portion will be described in detail shortly.

Generally explaining a typical scanning operation, and directing attention to system 36, when a log such as log 12 is positioned in station 10, and is ready to be scanned, a suitable command, initiated in any convenient way, as by an operator pressing a push button, is issued to instruct computer 42 to begin the operation. In system 36, scanning takes place in the form of successive, laterally displaced vertical scanning sweeps which move, as the log is viewed from the point of view of mirror 40, from the left to the right (downwardly through station 10 in FIG. 2). Indicated by dash-dot lines 84, 86, 88, 90, 94 in FIG. 2 are six, spaced adjacent planes which indicated parallel planes containing points of incidence of the scanning beam in six successive adjacent scanning sweeps progressingly downwardly along the log. The scanning sweep producing incidence points in plane 84 might result, for example, from a downward scanning movement across the log (i.e., normally away from the viewer in FIG. 2). If such were the case, the next successive adjacent scanning sweep producing incidence points in plane 86 would be an upwardly directed sweep. Thus, successive adjacent scanning sweeps occur in reverse directions.

Still considering generally a scanning operation, with a scanning sweep beginning at the limit of the scan field represented by line 60, mirror 40 is appropriately adjusted by motor 54, and in the first scanning sweep, is stepped by motor 52 from the upper to the lower limits of the scan field represented by lines 66, 68, respectively, in FIG. 1. At the end of this scanning sweep, motor 54 is stepped to rotate mirror 40 3-milliradians clockwise in FIG. 2, whereupon an upward scanning sweep begins. This sweep is followed by a downward sweep, and so on, until scanning reaches the opposite limit of the scan field.

What has just been discussed generally, is a scanning operation in which mirror 40 is stepped to produce scanning throughout the entirety of the scanning field useable by system 36. In fact, it is not necessary much of the time to utilize the entire scanning field. More particularly, in the case of scanning various sizes of logs, it is inefficient and pointless to carry out scanning beyond the diametral margins of the log as it is seen from mirror 40. Accordingly, part of the program which is resident in computer 42 instructs the computer, initially, to operate system 36 in what will be referred to herein as a pre-scan search mode. Features of this search mode form no part of the present invention, but are explained hereinbelow generally in order to afford the reader a better understanding of subsequent operation of the system.

Also, it is not always necessary to perform scanning with the full lateral "definition" capability of system 36. In other words, successive scanning sweeps may be selected, through programming of computer 42, which are more widely spaced than the ½-inch spacing mentioned in connection with FIG. 3. In fact, and in the particular setting now being described, adjacent scanning sweeps are spaced by about 10-inches—a selection which has proven to be entirely satisfactory for scanning logs prior to head-rig sawing.

Explaining briefly the pre-scan search mode of operation mentioned above, at the beginning of a scanning operation, computer 42 "directs" motors 52, 54 to cause several (typically three or four) relatively widely spaced scanning sweeps to occur, along approximately an 8-foot length within observation zone 10. The purpose of these sweeps is to generate range data, referred to herein as data records, which indicate roughly the position of a log within the scanned portion of zone 10, as well as the approximate diameter of the log. From this information, the computer determines an appropriate "limited" scan field (within the total scan field capability of the system) which will produce, as effectively, accurately and efficiently as possible, profiling data enabling proper positioning of the log relative to the head-rig saw blade.

There are, essentially, three determinations which, at the option of the user, may be made at this point in time by the computer. One of these is the vertical length of the scanning sweeps which will be used; another is the spacing between sweeps; and the third is the elevation of the initial scanning sweep produced in each of the four systems like system 36. Experience has shown that, with logs having diameters falling within the range of diameters mentioned earlier, and with the system of the invention having an "adaptive scanning" capability which will be detailed below, it is entirely satisfactory to employ a scanning sweep having a length of about 6-inches. Hence, in system 36 and in its companion systems, this decision (i.e., length of scanning sweep) is taken away from computer 42. Also, experience has shown that in the kind of operation being described herein, it is entirely satisfactory to utilize successive adjacent scanning sweeps which are spaced laterally by about 10-inches. Accordingly, this decision too is taken away from computer 42. Where to locate the elevation of an initial scanning sweep is based upon pre-scan data records that indicate the approximate elevational location of a log, in each of the four regions of zone 10 covered by four scanning systems.

While, therefore, the apparatus being described denies computer 42 the opportunity to make two of the three decisions above referred to, it should be understood that it is a user's option to change this situation. Typically, the user would not change the pre-made decision respecting lateral spacing of successive adjacent scanning sweeps. However, the user might well choose to have the computer select several different lengths of scanning sweeps, depending upon specific log diameter as determined in a pre-scan search.

As has been expressed above, a very significant and important aspect of the present invention is the feature referred to as adaptive scanning—a feature whereby the computer, based on previously acquired data records from a prior scanning sweep, positions the elevation of the next successive scanning sweep so as to cause scanning to "track" with the nearest point along a log relative to the cutting plane of the head-rig saw blade. This innovative feature of the invention will now be explained more fully with the aid of FIGS. 4, 5 and 7.

Figure 4:
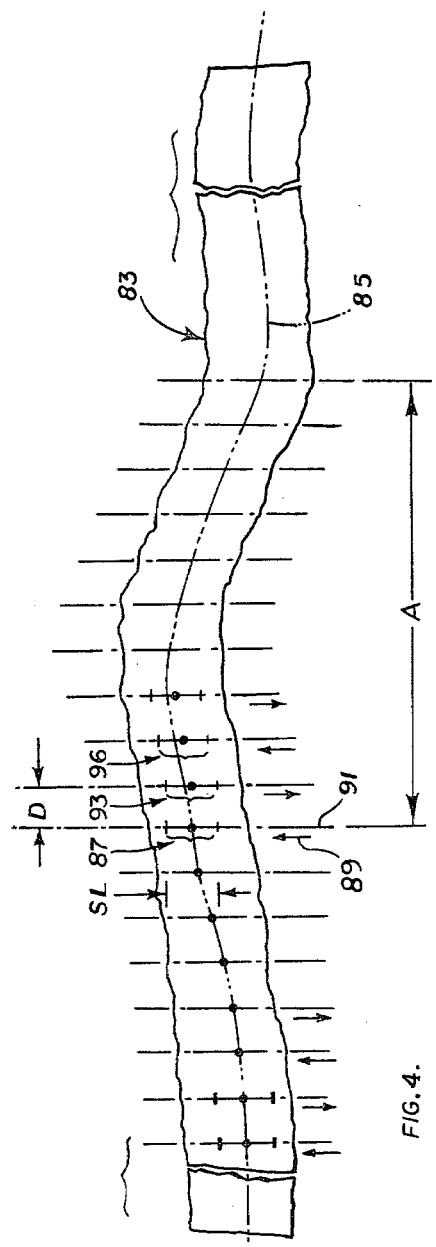
FIG. 4 is a simplified and highly distorted side view of a log, which view is useful in illustrating an adaptive scanning feature of the invention.

Indicated generally at 83 in FIG. 4 is a side view of a log, as viewed from point 50—which log is noticably crooked. It should be noted that many logs which are received for head-rig sawing are in fact crooked, but normally not to the degree depicted for log 83. As was mentioned above in the description of the drawings, log 83 has purposely been shown with a high degree of crookedness in order to aid in a clear understanding of the adaptive scanning feature of the invention.

Log 83, like previously mentioned log 12, is about 32-feet long, and about 16-inches in diameter. The length portion of log 83 which is scanned by system 36 is designated A in FIG. 4. Two of the three other systems, like system 36, scan similar-length portions of log 83, to the left of the region handled by system 36 in FIG. 4. The fourth system handles that portion of the log which is to the right of portion A.

Thus, and considering now specifically the operation of system 36, from the data records developed in a pre-scan search like that described above, computer 42 determines where, in an elevational sense, to place the first scanning sweep for system 36. It should be recalled that what is important to locate in the profiling of log 83 is the ridge-like path of that portion of the log which is nearest to the cutting plane of the head-rig saw blade. In FIG. 4, this path is represented by dash-double-dot line 85. Ordinarily, the computer's decision regarding where to place the first scanning sweep for system 36 would not result in the center point of the scanning sweep coinciding with path 85. By chance this could, of course, occur, and such has been assumed in the placement of this first scanning sweep as depicted in FIG. 4. Thus, the first scanning sweep for system 36 is shown generally at 87 in FIG. 4, with the center point of this sweep being represented by a dot which coincides with path 85. Scanning sweep 87 takes place in upward direction in FIG. 4, as indicated by arrow 89, and has a length, designated SL, of about 6-inches. Further, scanning sweep 87 is depicted in FIG. 4 as occurring along a straight line designated by dash-dot line 91. The sweep is represented in this fashion inasmuch as, it will be recalled, FIG. 4 is taken from the point of view of point 50. Actually, were a viewer to be standing at a distance looking at that side of log 83 which is shown in FIG. 4, each scanning sweep, or at least many of them, would appear to occur along slightly curved paths over the surface of the log.

During the performance of scanning sweep 87, range data records are produced, and are recorded by computer 42, with each impingement of the log surface by a reflected beam from LDI 38. Each data record includes information respecting the angular position of mirror 40, as well as the distance of the point of impingement from reference point 50. From this information, which is derived in a spherical-coordinate sense, the computer determines, in Cartesian coordinates, the location of the nearest point of impingement located during the sweep. Inasmuch as we have assumed that the computer initially places scanning sweep 87 with its mid-point coincident with path 85, computer 42 will determine that the nearest point of impingement coincided with the mid-point of the span of sweep 87.

In general terms, then, the computer assumes, through its resident program, that the next-to-be-encountered near point of impingement, in the next scanning sweep, will lie at the same elevation as the corresponding point located in scanning sweep 87. Accordingly, the computer instructs motors 52, 54 to shift the next scanning sweep 10-inches to the right of scanning sweep 87 along log 83, with this second scanning sweep having an elevation on the log causing its mid-point to lie at the same elevation as the mid-point of scanning sweep 87. This next scanning sweep, which takes place in a downward direction in FIG. 4, is designated generally at 93 in the figure. The 10-inch distance between scanning sweeps 87, 93 is designated at D in FIG. 4.

Referring to scanning sweep 93, it will be noted that this sweep resides at the same elevation as scanning sweep 87. It will further be noted that the mid-point of scanning sweep 93, which is represented by a dot, falls below path 85 in FIG. 4. Accordingly, when the data records developed in scanning sweep 93 are examined by computer 42, the computer will detect that the nearest point of impingement occurred somewhere above the mid-point of sweep 93. As a consequence, and with respect to the next successive scanning sweep to the right of sweep 93, the computer will instruct the drive motors for the mirror so as to shift this sweep 10-inches to the right of sweep 93, and to elevate it, as closely as it can, by the vertical distance, noted in scanning sweep 93, between the mid-point of this sweep and the nearest point of impingement detected on the log. Accordingly, the next successive scanning sweep, designated generally at 96, is shifted upwardly by substantially this distance. This process then continues for successive scanning sweeps produced in system 36.

Figure 5:
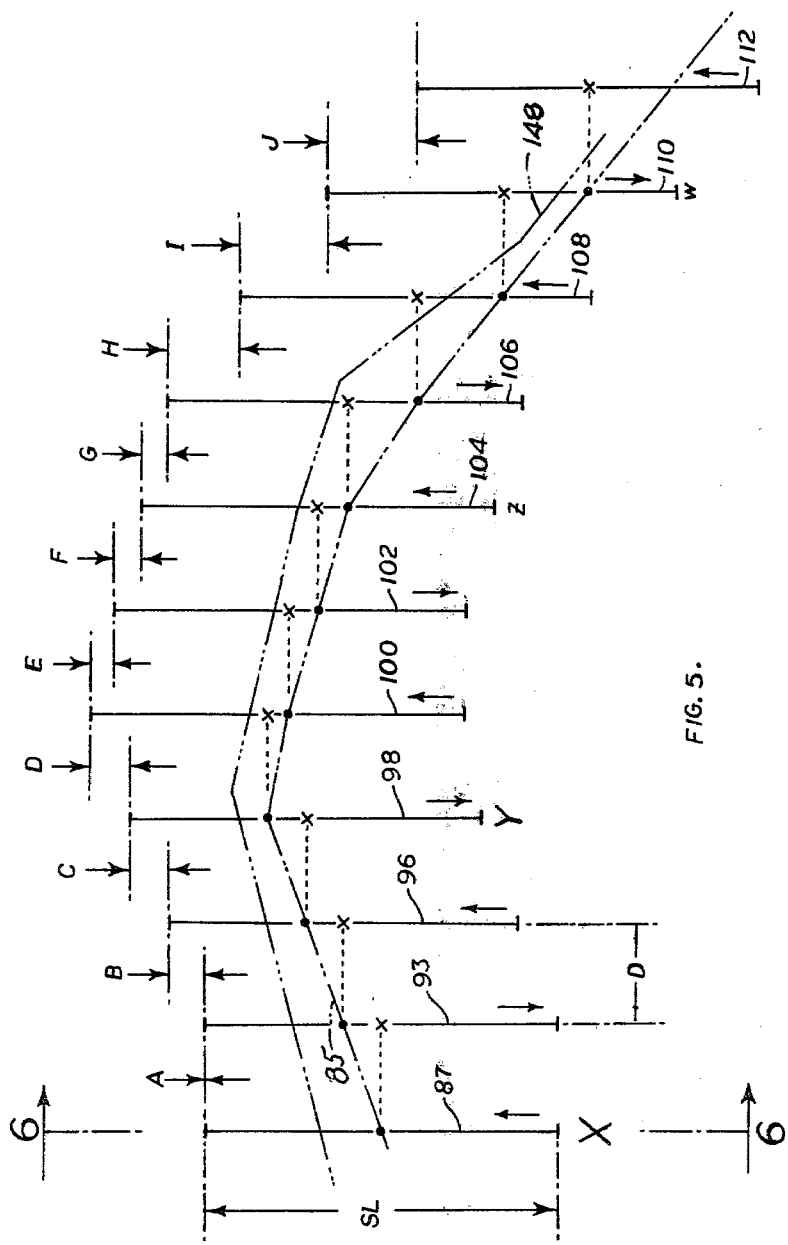
FIG. 5 is a schematic view, used as will be explained below, to describe two different kinds of scanning operations performable by the system of the invention.

Let us turn attention now especially to FIG. 5 which is useful in explaining, in somewhat more detail, the operation that has just been outlined in connection with FIG. 4. By way of a preliminary explanation of how FIG. 5 is used herein, the reader should know that FIG. 5 functions in a dual capacity. More specifically, and in one capacity, certain features in FIG. 5 serve to illustrate, in a laterally and vertically amplified fashion, a scanning sweep performed by system 36 within span A of log 83. In its other capacity, and as will be explained more fully below, these same features in FIG. 5, plus one additional feature (which plays no role in the figure's first-described capacity) serve to illustrate another kind of operation for which a system like system 36 is especially suited—namely the profiling, or locating, of wane in a cant. As was just mentioned, this other capacity of FIG. 5 will be detailed below.

Previously mentioned scanning sweeps 87, 93, 96 are shown on the left side of FIG. 5. Eight other additional scanning sweeps characterize the operation of system 36—with these sweeps progressing uniformly from the right of scanning sweep 96 in FIG. 5, and being designated 98, 100, 102, 104, 106, 108, 110, 112. As was previously mentioned, the scale of FIG. 5 is considerably expanded with respect to the scale of FIG. 4, with the vertical scale being more expanded than the horizontal scale. The purpose for this expansion is to enable a clear understanding of vertical adjustments which are produced by computer 42 in successive adjacent scanning sweeps, in order to carry out the adaptive scanning feature of the invention.

As was discussed earlier, and as is illustrated in FIG. 4, the mid-point of sweep 87 intersects path 85. As a consequence, computer 42 determines that the next successive scanning sweep, 93, should be placed with its mid-point at the same elevation as that of sweep 87. Consequently, there is no vertical shift of sweep 93 relative to sweep 87—such being indicated by the 0-inch dimension A in FIG. 5. The data records developed as a consequence of sweep 93 show the nearest point of the near side of log 83 to be above the mid-point of the scanning sweep, by the dimension B in FIG. 5. Therefore, the next successive adjacent scanning sweep, 96, is shifted upwardly, as closely as possible, by dimension B. Similarly, and for the same reasons, scanning sweeps 98, 100 are shifted upwardly relative to their predecessors, as closely as possible, by the dimensions C, D, respectively. Thereafter, the computer detects a "downward flow" in path 85, with scanning sweeps 102, 104, 106, 108, 110, 112 being shifted downwardly relative to their predecessors by substantially the dimensions E, F, G, H, I, J, respectively.

It will thus be apparent that through the process of adaptive scanning which has just been described, successive adjacent scanning sweeps in a scanning operation tend to track with, or follow, the ridge-like path defined by the nearest portion of a scanned log. As a consequence, it is possible, after a pre-scan search mode operation, to "shrink" considerably the specific scan field which is used, without any appreciable likelihood of a scanning sweep missing the desired point of interest in a scanned log. By shrinking the actual scan field which is used without jeopardizing acquisition of the required data records, the system of the invention is capable of acquiring, processing and acting on these data records extremely rapidly and efficiently. Put another way, by using the pre-scan search mode to locate a log and to note its rough diameter, and by employing, then, adaptive scanning to focus and economize the portion of the total scan field which is used, effective scanning speed is maximized.

Figure 7:
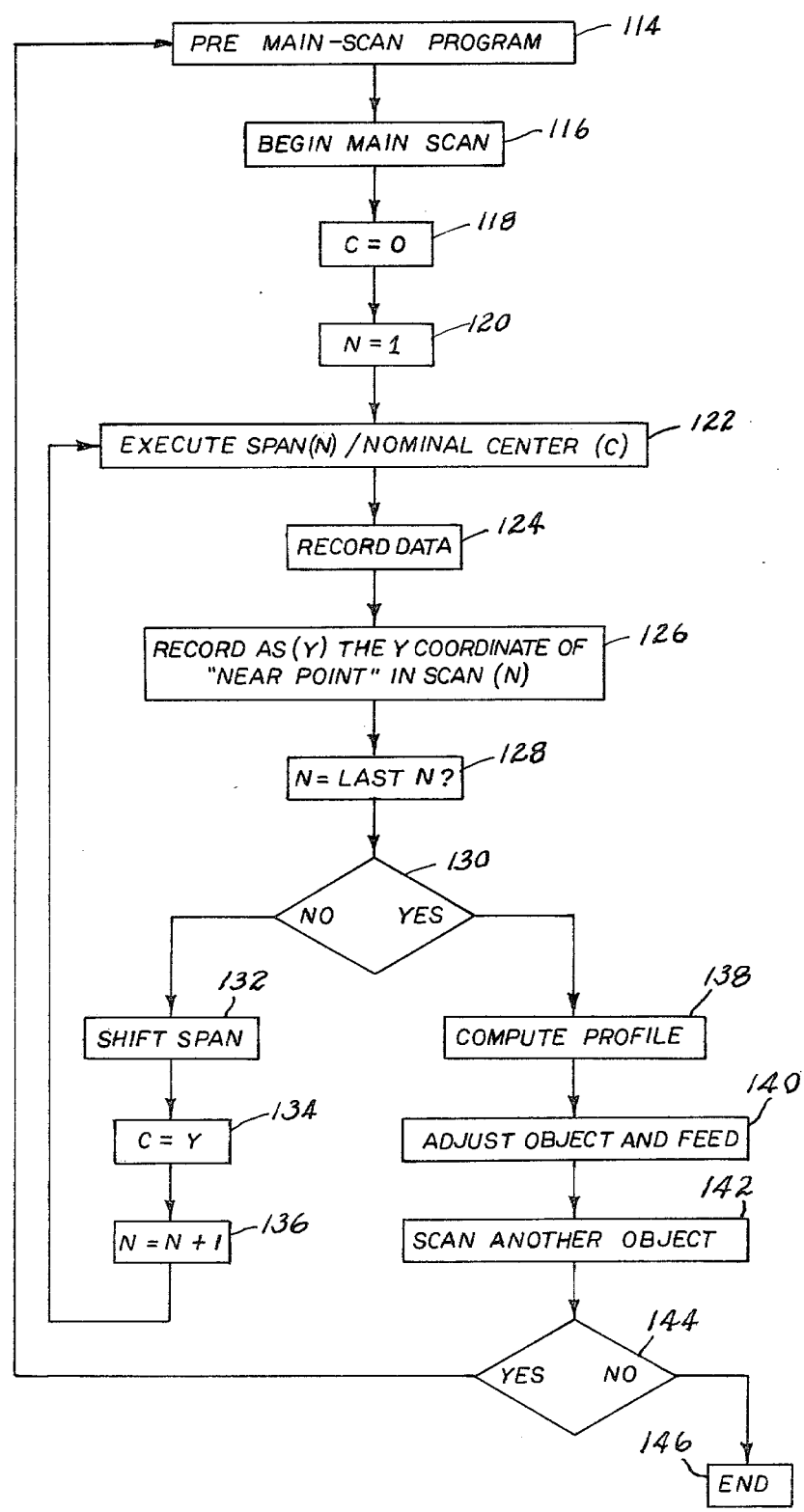
FIG. 7 is a flow chart of a program employed by a digital computer which forms part of the system of FIG. 2.

Let us turn attention now to FIG. 7, in order to see how the program which is stored in computer 42 defines the operation of system 36. FIG. 7, as mentioned earlier, is a partial flow chart of the controlling resident program. Those skilled in the art will appreciate, from a review of FIG. 7, that there are many specific ways in which the operations designated in the various blocks in the figure can be performed. The specific detailed steps themselves form no part of the present invention, and accordingly are represented in summary form only in the figure.

What has been referred to hereinbefore as a pre-scan search mode is represented by block 114—designated "Pre Main-Scan Program". When, for example, an operator initiates operation of system 36, control of the system is under the influence, so-to-speak, of block 114 to acquire pre-scan information respecting, generally, log placement and diameter. Following control by block 114, the computer transfers control to block 116—designated "Begin Main Scan". Program control then flows to blocks 118, 120, in succession, wherein the arbitrary variables C and N are initialized to the numeric values 0 and 1, respectively. After initializing of these variables, program control transfers to block 122—designated as indicated in FIG. 7. With variables C and N initialized as just indicated, block 122 causes motors 52, 54 to operate in such a manner that they execute scanning sweep number 1, with its center point placed at an initial nominal center point, identified arbitrarily as 0. The selection of this initial nominal center point is made by the computer, on the basis of the data records acquired during the pre-scan search.

With execution, then, of this first scanning sweep, the program, under the control of block 124 causes the computer to acquire and record the data records developed during the scan. As was discussed earlier, each data record is derived in terms of spherical coordinates, which the computer then processes to convert into Cartesian coordinates. All of these coordinates are expressed with relation to reference datum point 50.

Under the control of program block 126, the computer, after noting the Y (vertical) Cartesian coordinate of the nearest point of the log which was found in the first scanning sweep, records this value, and causes the arbitrary variable Y to assume this value.

In the specific system which is being described, each overall scanning operation of system 36 comprises eleven scanning sweeps. Under the control of program block 128, the computer "questions" whether the variable N is equal to the highest value selected for N—namely 11—and if the answer is "No", and through decision block 130, transfers program control to block 132. Considering the fact that N at this point in time is equal to 1, program control is so shifted. Under the control, then, of program block 132, motor 54 shifts mirror 40 to prepare the system for the next successive adjacent scanning sweep. Thereafter, and under the control of program blocks 134, 136, the value of variable C is set to equal the then value of variable Y, and the value of variable N is incremented by the interger 1. Hence, variable C now has the value of the Y coordinate noted for the nearest point of the log as detected in the first scanning sweep. The value of variable N is increased to 2, and system control reverts to program block 122.

The operation which has just been described concerning program blocks 122 through 136, inclusive, continues in an obvious fashion until the value of variable N equals the number 11. And, it will be apparent how, for each successive scanning sweep, the central point thereof is set to coincide with the value of the Y coordinate of the log near point noted in the preceeding scanning sweep.

When N equals 11, decision block 130 transfers program control to block 138. Under the control of block 138, computer 42 computes the desired "profile" of the log, and transfers program control to block 140. Then, and under the control of block 140, hydraulic motors 28, 30 are adjusted to set the proper taper for the scanned log (relative to the cutting plane of the head-rig saw blade). Thereafter, and still under the control of program block 140, the log is maneuvered, and fed back and forth (on the carriage) with respect to the head-rig saw blade to produce an opening face cut, and successive later cuts.

After such handling of a log, program control transfers to block 142, whereby the computer "questions" whether there is another log in zone 10 which is to be scanned. This information may be supplied the computer in any one of a number of different ways, as, for example, by operator input, or perhaps automatically by suitable sensors provided on the support and transport system for a log. If the answer to this inquiry is "Yes", program control is transferred via decision block 144 to block 114, whereupon the overall operation just described is begun anew for the next log. If the answer to such inquiry is "No", program control transfers to the ending program block 146.

Directing attention now to another type of scanning or profiling operation for which the system of the present invention is especially well suited, what is now to be described is how the system may be used for detecting the configuration of wane in a cant, preparatory to feeding the cant through an edger saw blade. Throughout this discussion, reference is made to FIGS. 5 and 6.

FIG. 5 will now be used in what was referred to earlier as its "other" illustration capacity. More particularly, FIG. 5 will now be considered as showing a fragmentary plan view of a portion of a cant having wane. Specifically, dash-triple-dot line 148 in the figure represents the outer edge of wane in the cant. Previously described dash-double-dot line 85 represents the line of joinder between wane and a flat sawn surface in the cant. Thus, the region illustrated between lines 85, 148 represents the appearance of the wane as viewed along a line normal to the plane of the cant. This wane may be thought of as sloping from line 85, away from the plane of FIG. 5, toward line 148. The region below line 85 in FIG. 5 represents a portion of the flat sawn surface just mentioned in the cant. Finally, it should be appreciated that the crookedness depicted for the margin of the cant, represented by lines 85, 148, is exaggerated intentionally to aid in an understanding of how system 36 performs.

Figure 6:
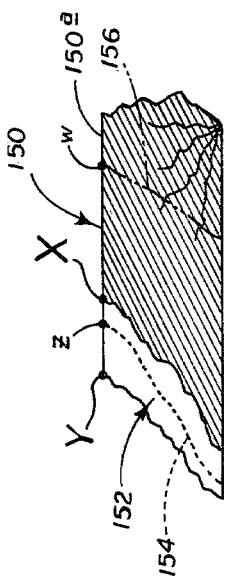
FIG. 6 is a fragmentary end view of a cant requiring edging.

FIG. 6 is intended to represent a fragmentary cross section of the cant of FIG. 5, taken generally along the line 6—6 in FIG. 5. While solid lines to represent a cant have not been used in FIG. 5, in order that this figure might also be used in the capacity previously described, FIG. 6 represents a cant in solid lines.

Describing FIG. 6 in more detail, the cant illustrated therein is shown generally at 150—having a wane indicated at 152. The upper surface 150a of cant 150 in FIG. 6 is the surface which confronts the viewer in FIG. 5—below line 85 in the latter figure.

The reader will note that were a view taken of such a cant along line 6—6 in FIG. 5, only a portion of the wane which appears in FIG. 5 would be directly visible in FIG. 6. In order to aid the reader in interpreting the relationship between FIGS. 5 and 6, four of the previously described scanning sweep lines (87, 98, 104, 110), which lines may be thought of as representing planes normal to the plane of FIG. 5, have been designated at their lower ends in FIG. 5, with the letters X, Y, Z and W, respectively. In the order of the letter characters just given, the same have been placed on FIG. 5 in progressively diminishing sizes. In FIG. 6, these same letters, in the same diminishing-size relationship, are represented as points or dots on surface 150a. The principal purpose for this size differential is to aid the reader in relating FIGS. 5 and 6. Thus, in FIG. 6, the portion of wane which extends between planes X and Y in FIG. 5 is directly visible in FIG. 6. The portion of wane extending between planes Y and W in FIG. 5 is concealed from direct viewing in FIG. 6. In FIG. 6, dashed line 154 represents the line of intersection between plane Z (in FIG. 5) and the adjacent wane in cant 150. Similarly, dash-double-dot line 156 in FIG. 6 represents the line of intersection between plane W (in FIG. 5) and the adjacent wane in the cant. Finally, the progressively smaller sizes used for letters X, Y, Z and W have been selected simply to represent for the viewer that planes X, Y, Z and W exist in progressively more distant planes (in FIG. 6) which parallel the plane of FIG. 6.

Through considerations which are well known in the sawmill industry, edger cutting formulae have been developed which, based on the wane profile in a cant, determine how a cant should be oriented relative to an edger saw blade (prior to an edger cutting operation) to maximize yield. System 36 is used to obtain data records regarding wane profile in order to promote an accurate and speedy application of these formulae—followed by appropriate control instructions to the equipment handling a cant relative to an edger saw blade. Thus, what is important in scanning a cant, such as cant 150, is locating the path which defines the line of joinder between wane in the cant, and the surface thereadjacent, such as surface 150a.

For such an operation, and considering that it is normal for a cant to be occupying a horizontal plane before and during an edging operation, system 36 is disposed at a suitable distance above this plane, with point 50 again forming a reference datum point for the purposes of subsequent control calculations.

Operation of the scanning system is substantially the same as that described above for preparing a log for head-rig cutting. In particular, a pre-scan search is performed to acquire a rough "picture" of the location and distribution of wane in a cant. From this information, computer 42 acquires data records indicative generally of the location of the line of joinder between the wane and the cant's nearest surface. Thereafter, and on the basis of these data records, the computer determines where to place the central point of the first scanning sweep in a scanning operation, and, optionally, decides how long to make each scanning sweep. While the latter kind of a decision can be made for each individual cant, there are many operations in which the user may choose to preselect a fixed scanning sweep length.

Scanning then takes place in virtually the same manner described earlier. For the sake of descriptive illustration herein, successive adjacent scanning sweeps are again placed at 10-inch intervals, with eleven scanning sweeps defining an overall scanning operation. During each scanning sweep, the computer notes the position of the point of intersection in the sweep between wane and flat surface. If, and as, this point shifts from sweep to sweep, the central point of the next successive scanning sweep, as between any two successive adjacent sweeps, is adjusted to correspond, as closely as possible, to the point of intersection noted in the preceeding scanning sweep. Thus, scanning takes place in an adaptive manner, with the scanning sweeps "tracking" the line of joinder between wane and cant surface.

After completion of a scanning operation, the computer, through a program substantially like that described earlier, controls feeding of the cant through an edger saw blade.

It will thus be apparent how the various features and advantages outlined for the instant invention are met by the construction and operations described herein. And, while only two kinds of scanning or profiling operations have been described specifically, and these only with respect to the wood products industry, it will be appreciated that the system of the invention has a range of applications much wider than these illustrations. The important adaptive scanning feature of the invention promotes high-speed, high-efficiency scanning while preserving maximum accuracy and reliability.

Another feature of the invention which should be noted is that, while adaptive scanning has been described in conjunction with following generally "linear" features in an object, the same kind of scanning is performable with features that are more curvilinear, including those which close upon themselves in a generally circular manner. Programming in computer 42 to accomplish this is well within the knowledge of those skilled in the art. In the case of following a generally circular feature, the computer would be programmed to change the angular directions of successive scanning sweeps. In other words, the computer would be programmed to note changes in the path of a scanned feature, and to change the angular direction of scanning accordingly.

Accordingly, while a preferred embodiment of the invention has been described, and two different kinds of operations explained, it is appreciated that variations and modifications, and other kinds of operations, may be made by, and are attainable with the invention without departing from its scope.

It is claimed and desired to secure by Letters Patent:

1. A three-dimensionally sensitive profiling system utilizing range data for scanning the near face of an elongate object which has an elongated feature whose lateral position may change along its long axis, said system comprising a projection scanner having a defined projection scanning sweep capable of projecting along different angularly displaced projection axes a scanning beam which, within such a sweep, can impinge such an object at different points distributed on opposite sides of said axis, a reception scanner having a defined reception scanning sweep, coordinated with said projection scanner for picking up along said different angularly displaced projection axes any reflection from such an object resulting from a projection scanner beam impingement with such an object, and means operatively connected to said two scanners for controlling automatically the operations thereof, whereby successive coordinated projection and reception scanning sweeps are shifted along the length of said axis, with the successive central positions of such sweeps generally following said axis on the basis of range data developed in the sweeps.

2. In an electro-optical system for profiling, three-dimensionally on the basis of range data, a spaced elongated object, such as a log, having a selected elongated feature which extends along a central long axis, where the object is placed in a defined elongated observation zone, means defining in three-dimensional space a reference datum point, means for directing, sequentially, and in side-by-side adjacent, span-defined transverse sweeps, from one end of said zone toward the other end thereof, and along a plurality of different angularly displaced direction axes, which axes intersect said zone at plural spaced points distributed throughout the zone, a beam of optical radiation, and for collecting along said axes any returned beam scattering resulting from beam impingement with an object in the zone, location-determining means operatively connected to said directing and collecting means, operable to monitor the instantaneous angular orientation of the then direction axis defined by the directing means, as well as the distance between said reference datum point and the then point, if any, of beam impingement with any object in said zone, and from such monitoring to produce a data record indicative of the exact point in three-dimensional space, relative to said datum point, occupied by such an impingement point, and means operatively connected both to said directing and collecting means, and to said location-determining means, responsive, at the conclusion of each of such transverse sweeps of said directing means, to the data record produced therein indicative of the location of said selected feature relative to said datum point, to adjust the transverse position of the span of the next successive transverse sweep.

* * * * *

UNITED STATES PATENT AND TRADEMARK OFFICE
CERTIFICATE OF CORRECTION

PATENT NO. : 4,300,836
DATED : November 17, 1981
INVENTOR(S) : James F. Holmes, et al.

It is certified that error appears in the above-identified patent and that said Letters Patent are hereby corrected as shown below:

On The Title Page,

The name of the inventor should read JAMES F. HOLMES, ET AL., instead of JONES F. HOLMES, ET AL.

Signed and Sealed this

Sixteenth Day of March 1982

[SEAL]

Attest:

GERALD J. MOSSINGHOFF

Attesting Officer     Commissioner of Patents and Trademarks